(12) United States Patent
Zhou (10) Patent No.: US 11,449,566 B2
(45) Date of Patent: Sep. 20, 2022

(54) METHODS AND SYSTEMS FOR PROCESSING GEOSPATIAL DATA (71) Applicant: Ordnance Survey Limited, Southampton (GB)

(72) Inventor: Sheng Zhou, Southampton (GB)

(73) Assignee: Ordnance Survey Limited, Southampton (GB)

( * ) Notice: Subject to any disclaimer, the term of this patent is extended or adjusted under 35 U.S.C. 154(b) by 0 days.

(21) Appl. No.: 16/915,053

(22) Filed: Jun. 29, 2020

(65) Prior Publication Data
US 2021/0004424 A1    Jan. 7, 2021

(30) Foreign Application Priority Data

Jul. 1, 2019    (EP) .................................... 19183720

(51) Int. Cl.
*G06F 16/9537* (2019.01)
*G06F 16/2455* (2019.01)
*G06F 16/29* (2019.01)

(52) U.S. Cl.
CPC .... *G06F 16/9537* (2019.01); *G06F 16/24566* (2019.01); *G06F 16/29* (2019.01)

(58) Field of Classification Search
None
See application file for complete search history.

(56) References Cited

U.S. PATENT DOCUMENTS

| 8,275,800 | B1 | 9/2012 | Virgil et al. | |
| 2010/0235146 | A1* | 9/2010 | Bennett | G06F 30/00 |
| | | | | 703/1 |
| 2011/0211729 | A1 | 9/2011 | Ramalingam et al. | |
| 2014/0074553 | A1* | 3/2014 | Sullivan | G06Q 30/0203 |
| | | | | 705/7.29 |
| 2014/0244635 | A1* | 8/2014 | Hu | G06K 9/4638 |
| | | | | 707/724 |
| 2015/0178986 | A1* | 6/2015 | Schpok | G06T 17/05 |
| | | | | 345/420 |
| 2019/0286635 | A1* | 9/2019 | Yu | G06F 16/904 |
| 2020/0097491 | A1* | 3/2020 | Berthiaume | G06K 9/0063 |

OTHER PUBLICATIONS

Moreira A. et al., "Concave Hull: A K-Nearest Neighbours Approach for the Computation of the Region Occupied by a Set of Points," Grapp 2007, Second International Conference on Computer Graphics Theory and Applications, Barcelona, Spain, Mar. 8-11, 2007, pp. 61-68.
EP Search Report—EP Application No. 19183720.2—dated Oct. 10, 2019.

* cited by examiner

*Primary Examiner* — Christopher J Raab
(74) *Attorney, Agent, or Firm* — Banner & Witcoff, Ltd.

(57) ABSTRACT

A computer-implemented method and system for generating partition polygons across a geographic area, wherein a concave hull of the reference network, usually a network of linear features such as roads, and the spatial data objects to be processed is first generated, the resulting concave hull thereby providing the boundary geometry for the final partition scheme. By generating a concave hull from the reference network and the spatial data objects, it is possible to derive a boundary that is based on the spatial position of the reference network and the spatial data objects at the periphery of the geographic area that they cover, that is, the boundary itself connects at least a portion of the end points of the reference network and the spatial data objects.

20 Claims, 8 Drawing Sheets
(5 of 8 Drawing Sheet(s) Filed in Color)

METHODS AND SYSTEMS FOR PROCESSING GEOSPATIAL DATA

FIELD

Aspects described herein relate to a computer-implemented method and system for processing geospatial data. In more particular, aspects described herein relate to a computer-implemented method of generating a partition scheme for the processing of large geospatial datasets.

BACKGROUND

Spatial databases are used as a means for storing and querying data representative of objects defined in geographic space, and are used to store and analyse information about different geographic areas. Within the geospatial dataset, objects of the geographic area may be represented as point features, linear features and areal features. For example, individual landmarks may be represented as data points, road networks, rail lines, coastlines and waterways may be represented as linear features, and building outlines and geographic regions such as towns, cities and counties or states may be represented as areal features.

For processing a large geospatial dataset, a partition scheme is often required to divide the source data into manageable chunks, each of which may be fit into a single cluster node, central processing unit (CPU), CPU core or the like, and ideally processed independent of other chunks. Such schemes are data and application dependent, but in general they should ensure that a spatial data object to be processed is contained in one and only one partition. That is to say, the boundary of a partition polygon should not intersect with the interior of spatial data objects in that partition, otherwise complicated deduplication and/or merge procedures are required to process those data objects. In addition, the generated partition polygons should have a high "square-ness", defined as the ratio of the area of the polygon to the area of its axis-aligned minimum bounding rectangle, to facilitate efficient spatial queries.

Figure 1A:
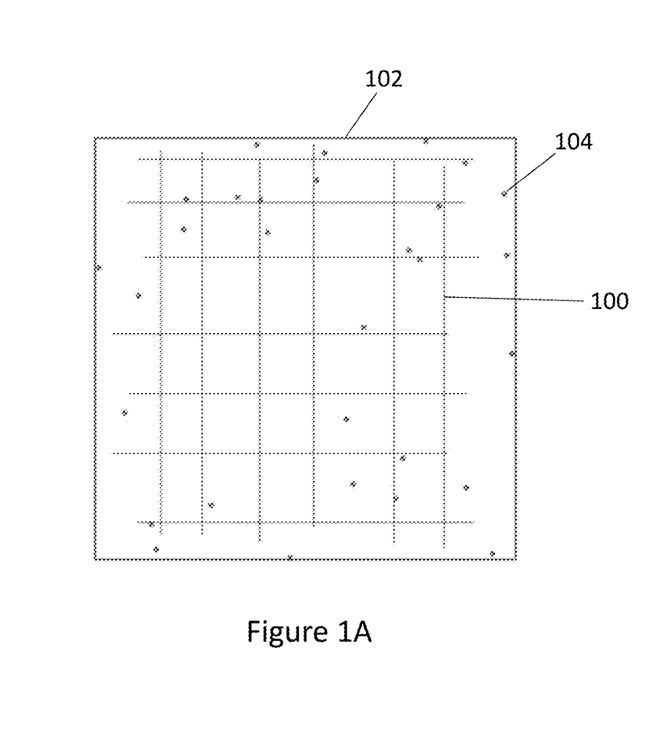
FIGS. 1A-B illustrate a known method for generating partitions from a geospatial dataset.
Figure 1B:
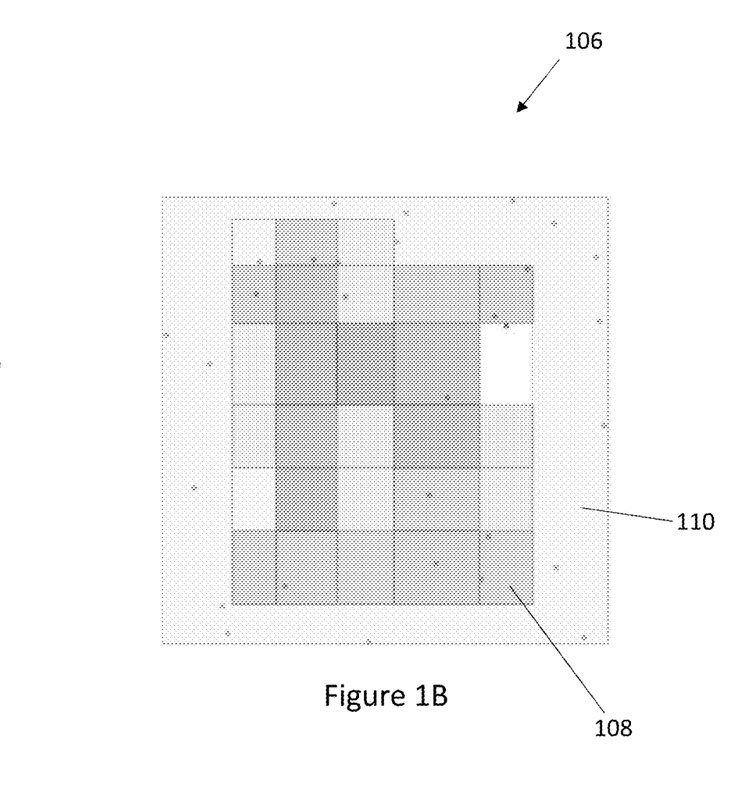

Such partition schemes often use linear features such as road networks and coastlines to form the boundaries of the partition polygon. However, in many cases, not all of the linear features used to generate the partition scheme will touch or intersect, which can result in irregular or oversized partition polygons that are difficult to process. FIGS. 1A-B show an example of such partition schemes. Here, the partition scheme 106 shown in FIG. 1B is generated from a road network 100 and coastline 102 for the purpose of generalising individual buildings 104 into building blocks, as shown in FIG. 1A. The coastline 102 serves as the boundary geometry enclosing the total area occupied by the spatial data objects 104 to be processed, whilst the road network 100 serves as the reference network that divides the bounding geometry 102 into multiple partitions. Due to the fact that most roads generally do not extend to the coastline, partitions 110 of thin and long shape, and in some cases circular, are often generated at the coastal area. Consequently, processing inside these partitions 110 will be very inefficient, and sometimes impossible, due to the high cost of spatial operations required in such cases.

SUMMARY

Aspects described herein address the above noted problem and others by providing a computer-implemented method and system for generating partition polygons across a geographic area, wherein a concave hull of the reference network, usually a network of linear features such as roads, and the spatial data objects to be processed is first generated, the resulting concave hull thereby providing the boundary geometry for the final partition scheme. By generating a concave hull from the reference network and the spatial data objects, it is possible to derive a boundary that is based on the spatial position of the reference network and the spatial data objects at the periphery of the geographic area that they cover, that is, the boundary itself connects at least a portion of the end points of the reference network and the spatial data objects. Consequently, the boundary lines of the concave hull intersect with more of the linear features of the reference network, particularly compared with the natural boundary geometry typically used such as coastlines, which helps to ensure that the partition polygons at the edges of the geographic area being processed are of a size and configuration that are easier and quicker to process.

A first aspect provides a computer-implemented method for generating partition polygons for a first geospatial dataset, the first geospatial dataset comprising a set of spatial data objects to be processed, the method comprising identifying a set of linear features in a second geospatial data set, generating a first enclosure representative of an area comprising the set of spatial data objects and the set of linear features, and generating a set of partition polygons for the set of geospatial data objects in dependence on a boundary of the first enclosure and the set of linear features, wherein a boundary of the first enclosure and the set of linear features define the vertices of the partition polygons.

As such, the edges of the partition polygons are generated based on (1) a reference network provided by linear features, such as a road network, the linear features corresponding to the same geographic area as the spatial data objects to be processed, and (2) the boundary edge of an area in which all of the spatial data objects and the linear features are contained, where the vertices of the boundary edge are either vertices of the spatial data objects to be processed or end points of the linear features from the reference network. As such, the boundary of the area enclosing all of the data objects and the linear features, is such that it intersects with the end points of the linear features and/or the spatial data objects, which helps to ensure that the polygons produced at the periphery of the geographic area being processed are of a size and configuration that is easy to process.

In some arrangements, the partition polygons may need to be generated such that each spatial data object is contained within one polygon. That is to say, the edges of the partition polygons do not intersect a spatial data object except at the boundary of the enclosing area. It is for this reason that linear features such as road networks are particularly suitable for generating partition polygons since they do not tend to intersect the real-world objects that the spatial data objects represent, such as buildings or landmarks. Once generated, the partition polygons may be output to the user via a display and/or output to a computer node for processing the spatial data objects within the polygons, for example, by performing spatial queries.

The first enclosure may be a concave hull, as is known in the art. In this respect, the boundary of the first enclosure may comprise a plurality of edge lengths connecting one or more of: a plurality of end points of the linear features and a portion of the spatial data objects. That is to say, the boundary is formed by connecting at least a portion of the spatial data objects and the end points of the linear features that are located at the periphery of the geographic area that they cover.

The vertices of the partition polygons may then be determined based on a plurality of intersections between the boundary of the first enclosure and the set of linear features. As such, by generating an enclosure having a boundary edge that intersects more of the reference network of linear features, this helps to ensure that the partition polygons generated at the edges of the geographic area are of a size and configuration that is easier to process.

In some cases, such as cases involving a very large dataset, generating the first enclosure may further comprise generating an initial enclosure using a first subset of data points, wherein the first subset of data points may be a set of vertices of the set of linear features. The first enclosure may then be generated from the initial enclosure based on a second subset of data points. Specifically, the second subset of data points may comprise spatial data objects located outside of the initial enclosure.

Generating the first enclosure may then comprise recursively searching the set of spatial data objects in dependence on the initial enclosure to identify the second subset of data points, wherein generating the first enclosure may then comprise adding the second subset of data points to the initial enclosure That is to say, given the initial enclosure, the spatial data objects may be processed one by one to determine whether they should be used to adjust the boundary of the initial enclosure.

In some arrangements, the initial enclosure may also be a concave hull.

As such, in cases involving a large amount of spatial data objects to be processed, the first step may be to produce an initial concave hull based on the vertices of the linear features being used as the reference network. The spatial data objects may then be recursively searched to find any sitting outside of the initial concave hull, with those spatial data objects being added to the initial concave hull until the boundary of the concave hull encloses all of the spatial data objects and the linear features.

Generating the first enclosure may I be generated in dependence on a criterion. For example, the criterion may define a maximum edge length of a boundary of the first enclosure. That is to say, each edge length of the boundary may be analysed to determine whether it exceeds a predetermined length, for example, 200 meters. If it exceeds the predetermined length, that segment of the first enclosure will be removed. This may then be repeated until none of the segments around the boundary exceed the maximum length.

A further aspect provides a system comprising a processor, and a computer readable medium storing one or more instruction(s) arranged such that when executed the processor is caused to perform the method described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further features and advantages will become apparent from the following description of embodiments thereof, presented by way of example only, and by reference to the drawings, wherein.

DETAILED DESCRIPTION

As discussed above, aspects described herein provide a method (and associated systems) of generating partition schemes for geospatial datasets by generating a concave hull of the reference network and the spatial data objects to be processed, wherein the resulting concave hull provides the boundary geometry for the partition generation.

Compared to previous techniques where natural boundary geometry is used, that is, other linear features surrounding the area to be processed such as coastline, the concave hull is much simpler in terms of the number of vertices in the geometry, which will result in partition polygons that are much easier to process, particularly those around the edges. Furthermore, the concave hull is adaptive to the spatial data objects and the reference network geometry, which will ultimately result in an improved enclosure of the spatial dataset. In cases where the reference network and natural boundary geometry do not intersect such that an enclosure cannot be made, for example, where the end of a road does not reach the coastline, the concave hull is more likely to include the end points of the reference network in the hull, which in this example would be the end of a road, to thereby make a complete enclosure of the data objects to be processed and prevent ring-shaped partitions from being generated. Consequently, smaller and more compact partitions will be generated, which will help to improve the performance and efficiency of any subsequent processing.

Figure 2:
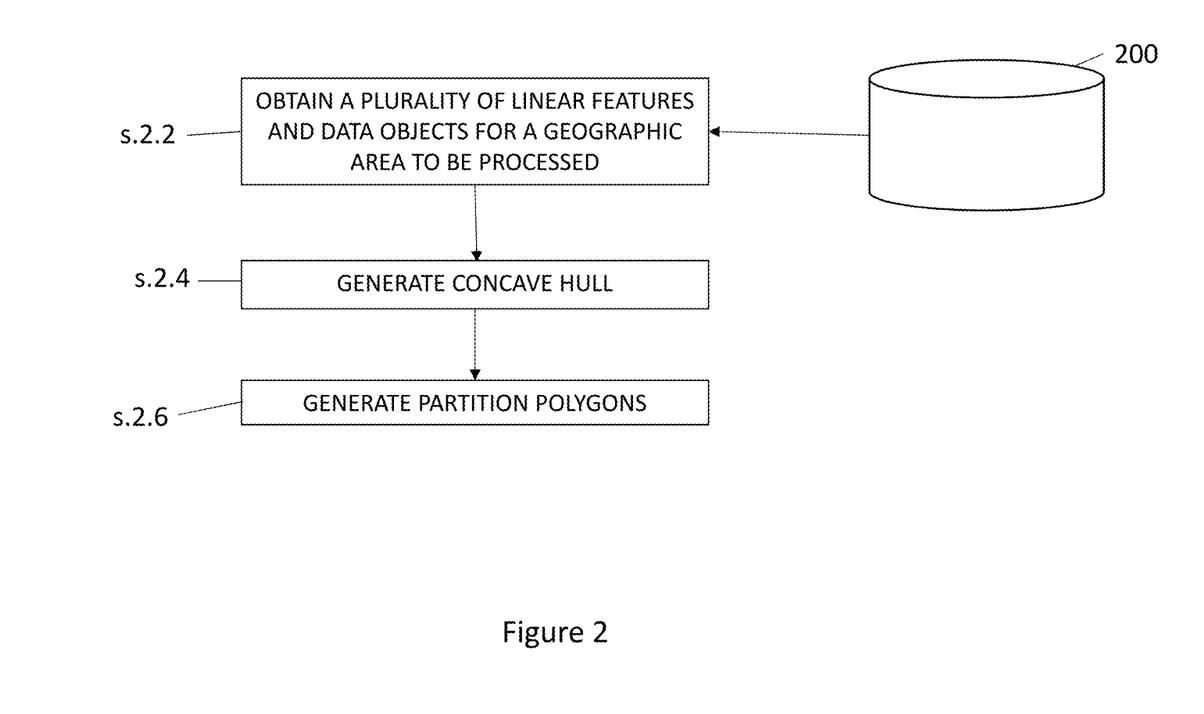
FIG. 2 is a flow diagram illustrating a method of generating partitions from a geospatial dataset according to a first illustrative aspect.

A first example of a method of generating partition schemes will now be described with reference to FIG. 2. In the first step 2.2, geospatial data is received from a spatial database 200. More specifically, a plurality of linear features and spatial data objects are received, wherein the linear features are to form the reference network for the partition generation, and the data objects are those that are to be subsequently processed.

Using the received data, the next step 2.4 is to generate a concave hull, wherein the vertices of the boundary of the concave hull are defined by the end points of the linear features that form the reference network and the spatial data objects to be processed.

Figure 3A:
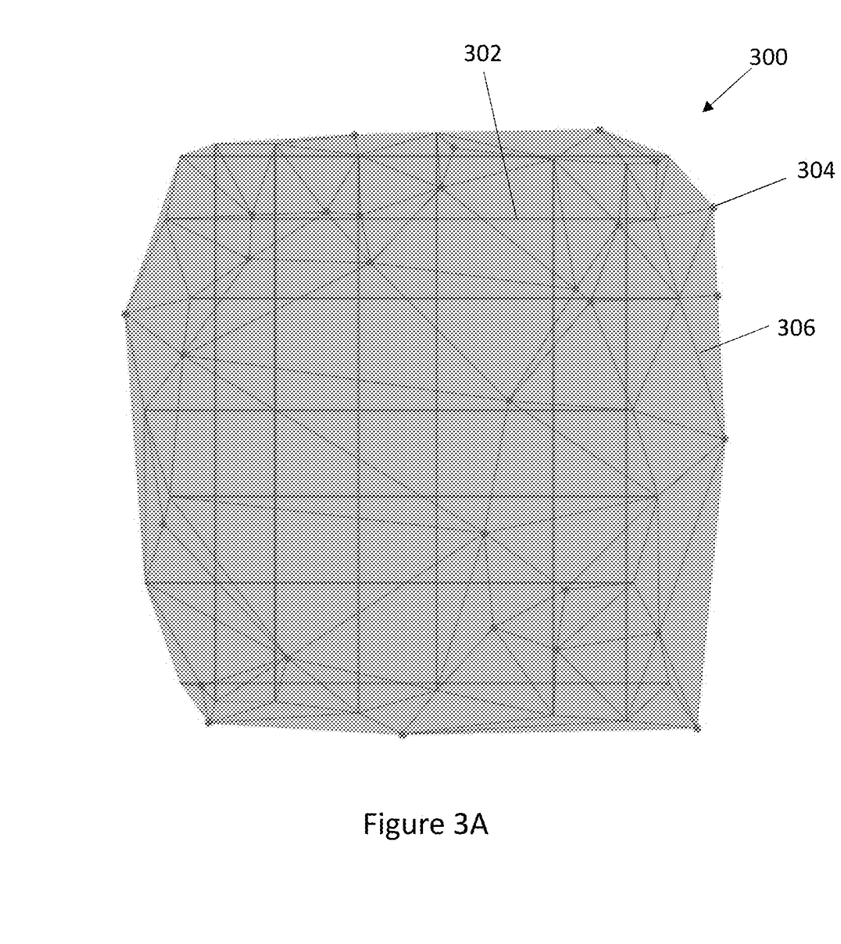
FIGS. 3A-C are diagrams illustrating the steps of the first illustrative aspect in use.

As is known in the art, construction of the concave hull typically starts with the generation of a convex hull 300 from the linear features 302 of the reference network and the data objects 304 to be processed, as illustrated by FIG. 3A. To generate the convex hull 300, the linear features 302 and the data objects 304 are triangulated together, for example, using constrained Delaunay triangulation, as is well known in the field of geospatial data. The convex hull 300 encloses the linear features 302 and data objects 304, such that the convex hull 300 is the minimum convex set comprising all of the linear features 302 and data objects 304. More specifically, the convex hull 300 represents the area containing all of the triangle edges 306 connecting each pair of points in a dataset, which in this case will be the data objects 304 and the end points of the linear features 302.

Figure 3B:
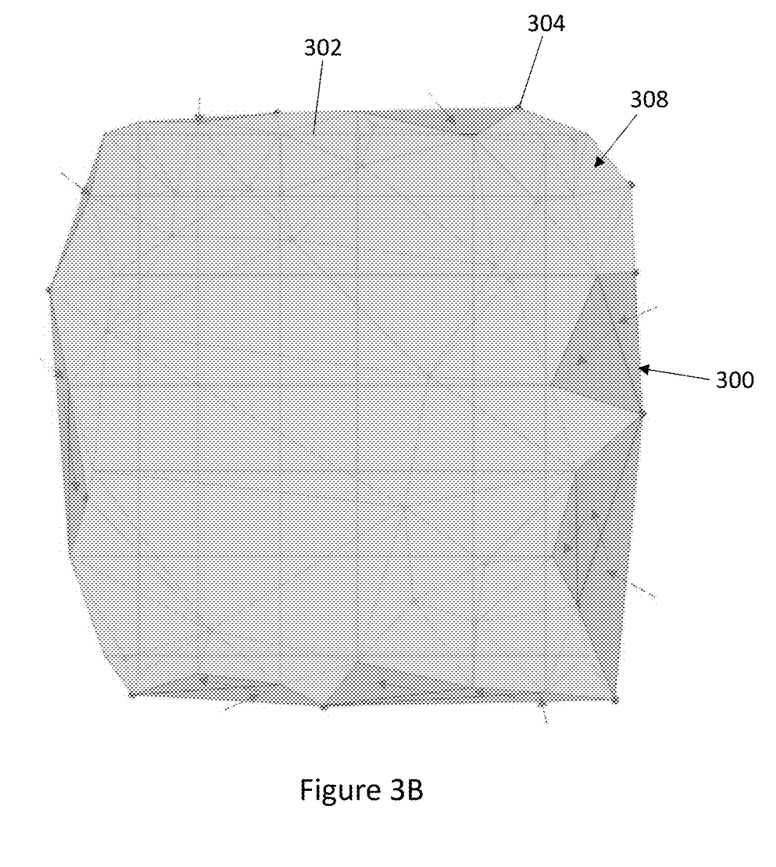

This convex hull 300 can then be used to generate the concave hull, as illustrated by FIG. 3B. The concave hull of a point set is effectively a subset of the convex hull of the dataset. The configuration of the concave hull 300, specifically, the outer vertices and edges will depend on the parameters of the concave hull generation, as will be described in more detail below. In this case, the concave hull 308 is generated such that that the boundary of the concave hull 308 is formed by connecting end points of the linear features 302 and peripheral data objects 304 as efficiently as possible, to thereby provide smaller partition polygons at the edges of the geographic area to be processed.

In this case, the concave hull 308 is generated by a process of "digging", wherein triangles from the triangulation of the convex hull 300 and data objects 304 are repeatedly removed according to a concave hull criterion so as to "dig" inwards. It will be appreciated that there are a number of different suitable methods by which this digging may be performed. One particularly suitable method is the use of the "Chi criterion" proposed by Duckham et al[1], which is effectively the maximum edge segment length of the concave hull boundary. As such, the triangles are analysed and removed if the length of their outer edge exceeds a predefined threshold. For example, the concave hull criterion may be set such that triangles having an outer edge length more than 200 m will be removed. It will of course be appreciated that the predefined threshold may be set at any suitable length according to the application and context in which the method is being applied, which may involve the processing of geospatial data at varying scales.

[1] Duckham et al. (2008). Efficient generation of simple polygons for characterizing the shape of a set of points in the plane. Pattern Recognition. 41. 3224-3236. 10.1016/j.patcog.2008.03.023.

Another example of a concave hull criterion that could be applied is the "alpha-shape criterion" proposed in Edelsbrunner et al[2], which is effectively the maximum radius of the circumscribed circle of a triangle at the boundary of the concave hull. If the radius is larger than the given threshold, the triangle will be removed from the concave hull.

[2] Edelsbrunner H, Kirkpatrick DG and Seidel R (1983). On the shape of a set of points in the plane", IEEE Transactions on Information Theory, 29 (4), 551-559

Figure 3C:
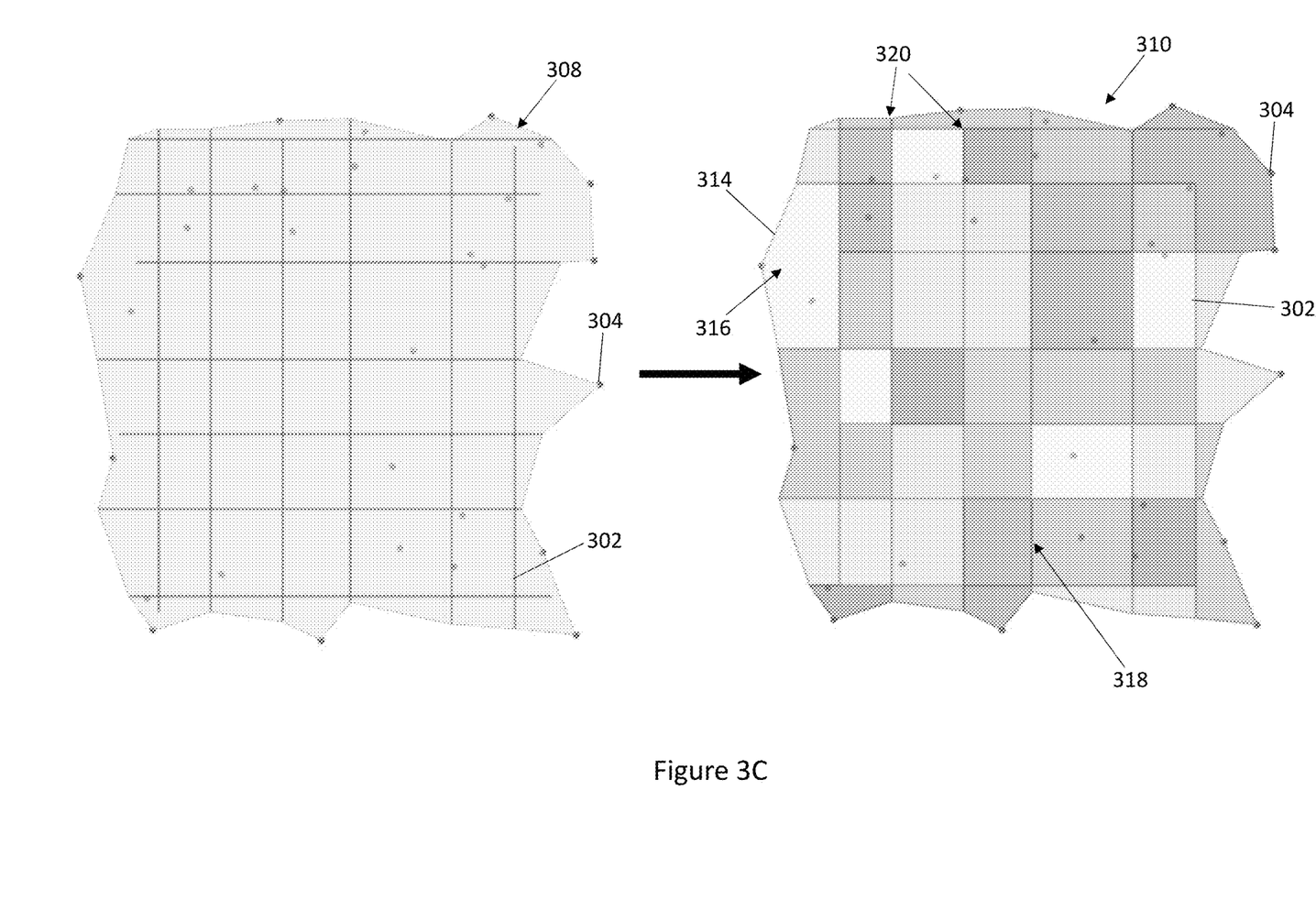

From this concave hull 308 and the linear features 302, a set of partition polygons 310 can be generated (s.2.6), as illustrated by FIG. 3C. Here, the concave hull 308 provides the boundary geometry, from which the outer edges 314 of the polygons 316 at the periphery of the geographic area are generated. Similarly, the linear features 302 provide the reference network, from which the remaining edges 318 of the partition polygons 310 are generated. As such, the vertices 320 of the partition polygons 310 are derived based on the points at which the linear features 302 of the reference network and the boundary of the concave hull 308 intersect with each other. If the set of partition polygons 310 comprise any particularly small polygons, that will therefore require very minimal processing, these may be merged together to provide the final partition scheme.

By using the concave hull 308 of the linear features 302 and the data objects 304 as the boundary geometry for the partition generation, the resulting boundary geometry has more connection points with the reference network compared to boundary geometry provided by natural enclosures such as coastlines and the like. As such, the concave hull 308 provides an improved enclosure of the reference network and data objects, resulting in smaller polygons at the edges that are much easier to process.

Figure 4:
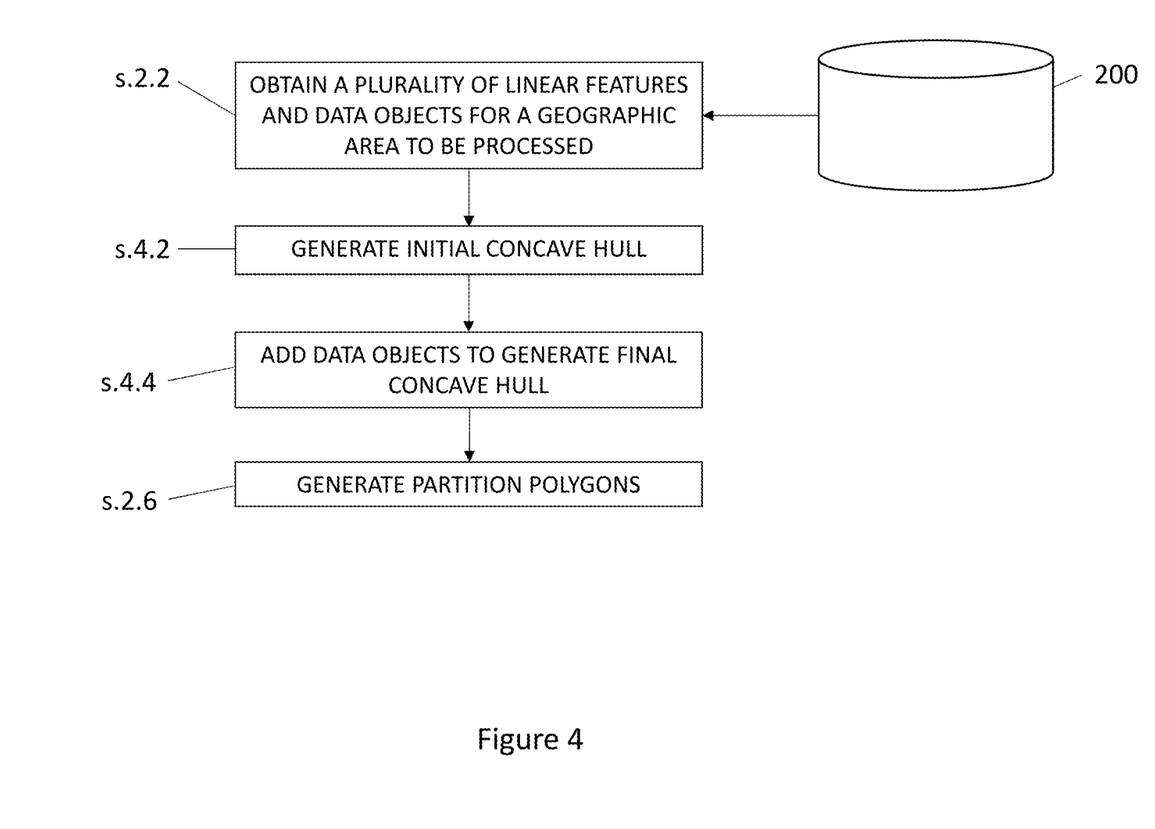
FIG. 4 is a flow diagram illustrating a method of generating partitions from a geospatial dataset according to a second illustrative aspect.
Figure 5A:
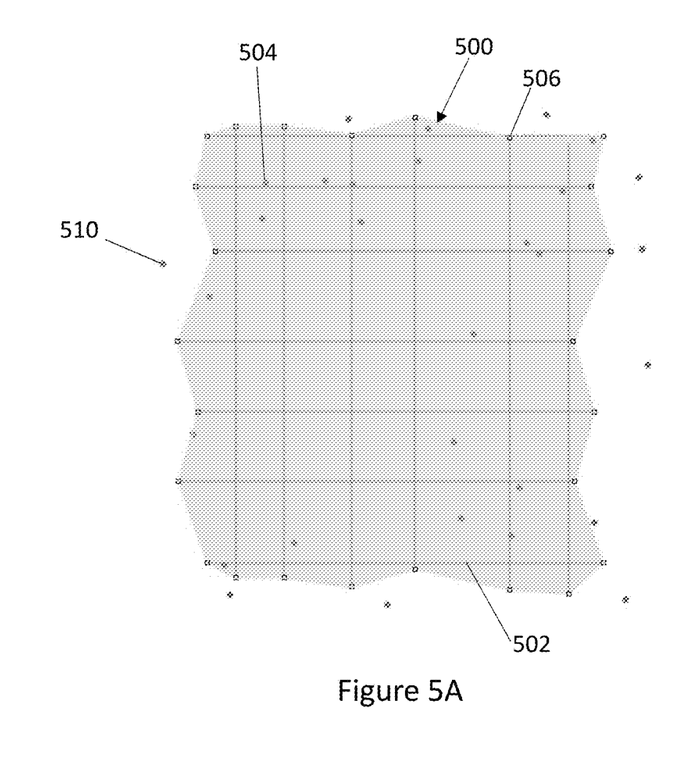
FIGS. 5A-B are diagrams illustrating steps of the second illustrative aspect in use.

When the number of data objects is very large, it may be difficult to create the concave hull efficiently, and so further processing is required in this case. A further example of a method of generating a partition scheme is illustrated by FIG. 4, for cases where the number of data objects is very large. In this example, the first step 2.2 is the same as that described with reference to FIG. 2. From the received data, an initial concave hull 500 is generated (s.4.2), as illustrated by FIG. 5A, in effectively the same way as described with reference to step 2.4 of FIG. 2. However, in this case, the initial concave hull 500 is generated from a subset of the data objects 504 to be processed and the linear features 502 that are providing the reference network. This subset can be derived either from a sampling of the data objects 504, or as in this case, using only the vertex data 506 of the reference network 502, which also forms part of the data for the concave hull construction. In this respect, the reference network 502 is naturally representative of the extent of the dataset and normally much smaller in data volume than the spatial data objects 504 to be processed.

The remaining data, in this case, the data objects 504, are then added bit by bit to "grow" the initial concave hull 500. This can be done by re-computing the concave hull based on the initial concave hull 500 and the newly added data objects 504, or by using a dynamic concave hull construction method which maintains the concave hull and its triangulation dynamically as data objects 504 are added.

Figure 5B:
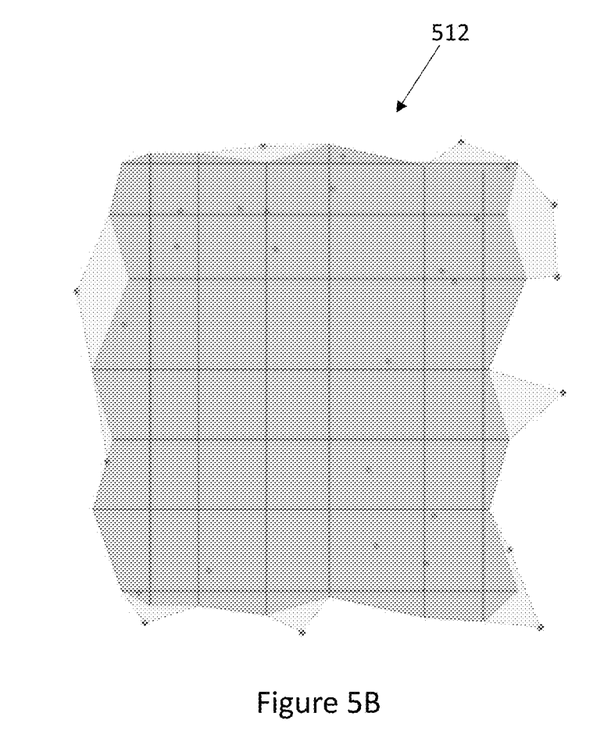

To do this, data objects 504, 510 are tested against the initial hull 500 to decide whether they should be added. A newly added data object 504 will only contribute to the boundary of the concave hull if it is outside of the initial concave hull 500. As such, data objects 510 outside of this initial concave hull 500 are added into the process to thereby generate the final concave hull 512 (s.4.4), as illustrated by FIG. 5B. Data objects 504 falling inside the initial hull 500 do not make any contribution to generating the final hull 512, and can be effectively ignored without any further processing required. This analysis may be performed by, for example, using a grid system to index the spatial data objects 504. For each grid cell, if it falls inside the concave hull 500 entirely, then all spatial data objects 504 inside the grid cell can be ignored.

The above process may be performed iteratively until all of the data objects 504 have been processed, and the final concave hull 512 has been generated.

Once this final concave hull 512 has been generated, a set of partition polygons may then be generated (s.2.6), as described above with reference to FIG. 2.

Figure 6:
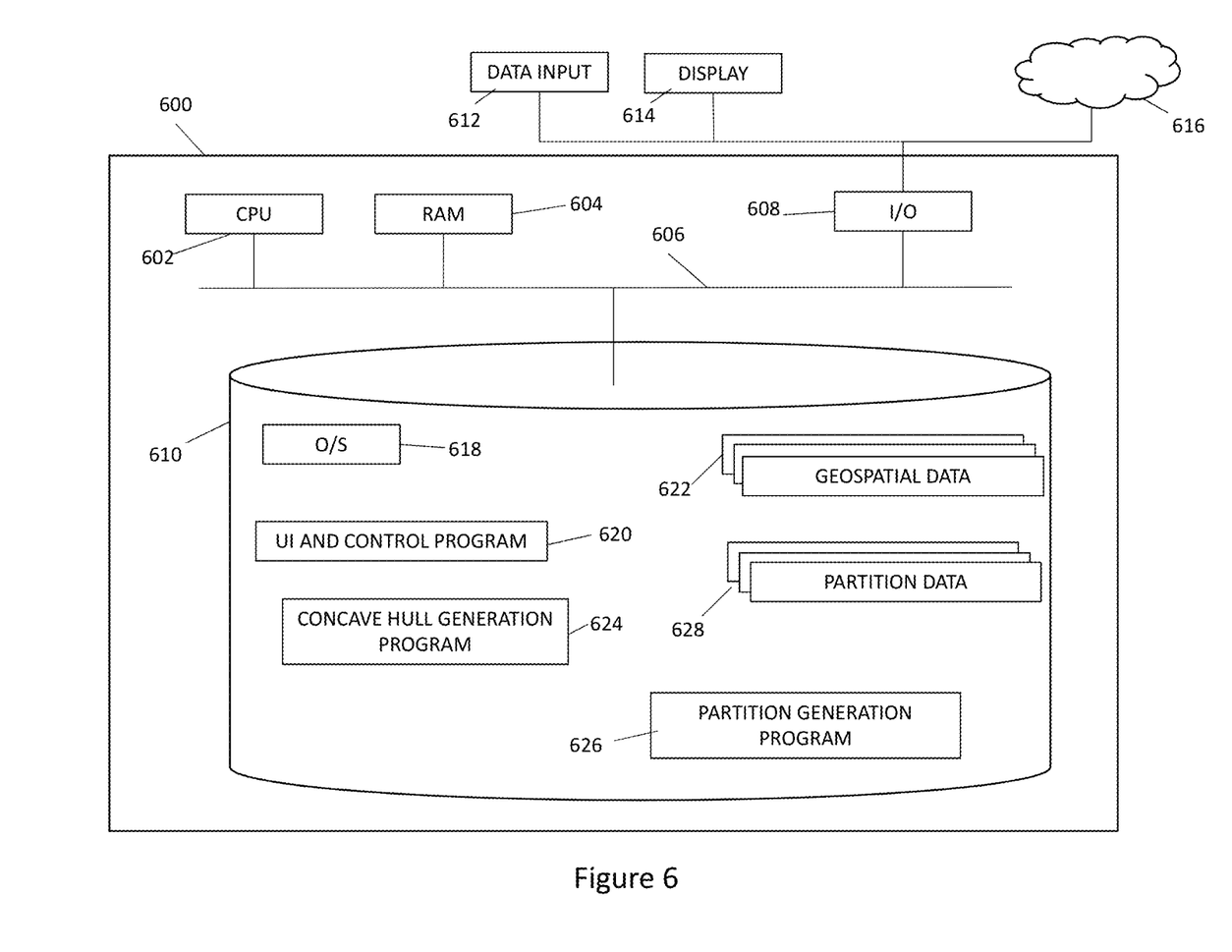
FIG. 6 is a block diagram illustrating a computer system on which aspects described herein may be implemented.

FIG. 6 illustrates an example of a general computing device 600 that may form the platform for one or more illustrative aspects described herein. For example, the computing device 600 may be a mobile phone, a tablet, a wearable computing device, IVI system or the like. The computing device 600 comprises a central processing unit (CPU) 602 and a working memory 604, connected by a common bus 606, and having an input-output (I/O) interface 608 arranged to receive control inputs from a user via a device connected to a data input port 612 such as a keyboard, mouse, touchscreen, push button, or other controller, and provide output information via a user interface which is displayed on a visual display device 614. The I/O interface 608 is also arranged to receive and output data via various other devices and networks, including but not limited to a local area network 616 to which a computer cluster comprising a plurality of nodes is connected.

The computing device 600 is also provided with a computer readable storage medium 610 such as a hard disk drive (HDD), flash drive, solid state drive, or any other form of general-purpose data storage, upon which stored data, such as a geospatial data 622, and various programs are arranged to control the computing device 600 to operate in accordance with one or more illustrative aspects described herein. For example, stored on the computer readable storage medium 610 is an operating system program 618 that when run by the CPU 602 allows the system to operate. Also provided is a concave hull program 624 and a partition generation program 626, which together implement the method of generating a partition scheme according to one or more illustrative aspects described herein when run by the CPU 602, as will be described in more detail below. In order to interface with and control the concave hull program 624 and partition generation program 626, a user interface and control program 620 is also provided, that controls the computing device 600 to provide a visual output to the display 614, and to receive user inputs via any input means connected to the data input port 612, or any other device connected to the I/O interface 608 in order to control the concave hull program 624 and partition generation program 626.

Upon receiving instructions to generate a partition scheme for a particular geographic area, for example, via the data input port 612, the user interface and control program 620 will extract the relevant data from the geospatial data 622, specifically, the linear features that are to form the reference network and the spatial data objects that are to be processed. The extracted data is input to the concave hull generation program 624, which will perform the necessary processing of the extracted linear features and spatial object data to generate the concave hull, as described with reference to steps 2.2, 2.4, 4.2 and 4.4 above. The resulting concave hull will then be input to the partition generation program 626, which will then generate the final partition scheme of the extracted geospatial data from the linear features of the reference network and the boundary of the concave hull. Once the final partition polygons have been generated, this may be stored as partition data 628. This partition data 628 may then be output via the display 614, as well as distributed to external networks and devices. For example, the partition data 628 may be distributed to a computer cluster via the local area network 616 for further processing, wherein each partition polygon is to be processed on a separate cluster node.

Various modifications, whether by way of addition, deletion and/or substitution, may be made to all of the above described embodiments to provide further embodiments, any and/or all of which are intended to be encompassed by the appended claims.

The invention claimed is:

1. A computer-implemented method of generating partition polygons for processing spatial data objects, the method comprising:
   identifying a set of spatial data objects for processing in a first geospatial dataset;
   identifying a set of linear features in a second geospatial dataset, wherein the set of linear features do not intersect the set of spatial data objects;
   generating a first enclosure having a boundary enclosing an area containing the set of spatial data objects in the first geospatial dataset and the set of linear features in the second dataset; and
   generating a set of partition polygons for processing the set of spatial data objects in dependence on the boundary of the first enclosure and the set of linear features contained within said boundary, wherein the boundary of the first enclosure and the set of linear features define vertices of the partition polygons and each spatial data object is contained within one of the set of partition polygons.

2. A method according to claim 1, wherein the first enclosure is a concave hull.

3. A method according to claim 1, wherein the boundary of the first enclosure comprises a plurality of edge lengths connecting one or more of: a plurality of end points of the linear features and a portion of the spatial data objects.

4. A method according to claim 1, wherein the vertices of the partition polygons are determined based on a plurality of intersections between the boundary of the first enclosure and the set of linear features.

5. A method according to claim 1, wherein generating the first enclosure further comprises generating an initial enclosure using a first subset of data points.

6. A method according to claim 5, wherein the first subset of data points are a set of vertices of the set of linear features.

7. A method according to claim 5, wherein the first enclosure is generated from the initial enclosure based on a second subset of data points.

8. A method according to claim 7, wherein the second subset of data points comprise spatial data objects located outside of the initial enclosure.

9. A method according to claim 7, wherein generating the first enclosure comprises recursively searching the set of spatial data objects in dependence on the initial enclosure to identify the second subset of data points.

10. A method according to claim 7, wherein generating the first enclosure comprises adding the second subset of data points to the initial enclosure.

11. A method according to claim 5, wherein the initial enclosure is a concave hull.

12. A method according to claim 1, wherein the first enclosure is generated in dependence on a criterion.

13. A method according to claim 12, wherein the criterion defines a maximum edge length of a boundary of the first enclosure.

14. A system comprising:
   a processor; and
   a computer readable medium storing one or more instruction(s) arranged such that, when executed by the processor, the system is configured to generate partition polygons for processing spatial data objects, by:
      identifying a set of spatial data objects for processing in a first geospatial dataset;
      identifying a set of linear features in a second geospatial dataset, wherein the set of linear features do not intersect the set of spatial data objects;
      generating a first enclosure having a boundary enclosing of an area containing the set of spatial data objects and the set of linear features; and
      generating a set of partition polygons for processing the set of spatial data objects in dependence on the boundary of the first enclosure and the set of linear features contained within said boundary, wherein the boundary of the first enclosure and the set of linear features define vertices of the partition polygons and each spatial data object is contained within one of the set of partition polygons.

15. A system according to claim 14, wherein the first enclosure is a concave hull.

16. A system according to claim 14, wherein the boundary of the first enclosure comprises a plurality of edge lengths connecting one or more of: a plurality of end points of the linear features and a portion of the spatial data objects.

17. A system according to claim 14, wherein the instructions when executed further configure the system to determine the vertices of the partition polygons based on a plurality of intersections between the boundary of the first enclosure and the set of linear features.

18. A system according to claim 14, wherein generating the first enclosure further comprises generating an initial enclosure using a first subset of data points, wherein the first subset of data points are a set of vertices of the set of linear features.

19. A system according to claim 18, wherein the instructions when executed further configure the system to generate the first enclosure from the initial enclosure based on a second subset of data points, wherein the second subset of data points comprise spatial data objects located outside of the initial enclosure.

20. A system according to claim 19 wherein generating the first enclosure comprises:
   recursively searching the set of spatial data objects in dependence on the initial enclosure to identify the second subset of data points; and
   adding the second subset of data points to the initial enclosure.

\* \* \* \* \*